Sept. 13, 1932.  T. BROWN  1,876,561
POWER TAKE-OFF MECHANISM FOR TRACTORS
Filed Jan. 9, 1928  4 Sheets-Sheet 1

INVENTOR
Theophilus Brown,
by Brown, Jackson, Boettcher & Dienner.
ATTORNEYS

WITNESS
W. Ackerman

Sept. 13, 1932.  T. BROWN  1,876,561
POWER TAKE-OFF MECHANISM FOR TRACTORS
Filed Jan. 9, 1928  4 Sheets-Sheet 2

WITNESS
W. Ackerman

INVENTOR
Theophilus Brown,
by Brown, Jackson, Boettcher and Dienner.
ATTORNEYS

Sept. 13, 1932.    T. BROWN    1,876,561
POWER TAKE-OFF MECHANISM FOR TRACTORS
Filed Jan. 9, 1928    4 Sheets-Sheet 3

WITNESS
W. Ackerman

INVENTOR
Theophilus Brown,
by Brown, Jackson, Boettcher & Dienner
ATTORNEYS

Sept. 13, 1932. T. BROWN 1,876,561
POWER TAKE-OFF MECHANISM FOR TRACTORS
Filed Jan. 9, 1928 4 Sheets-Sheet 4
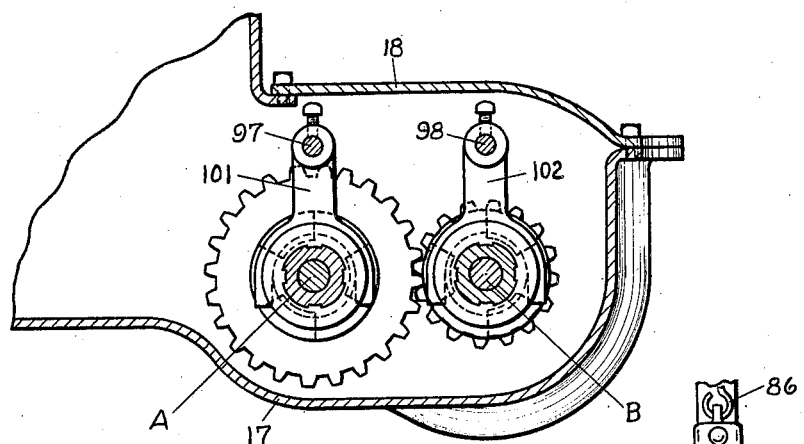
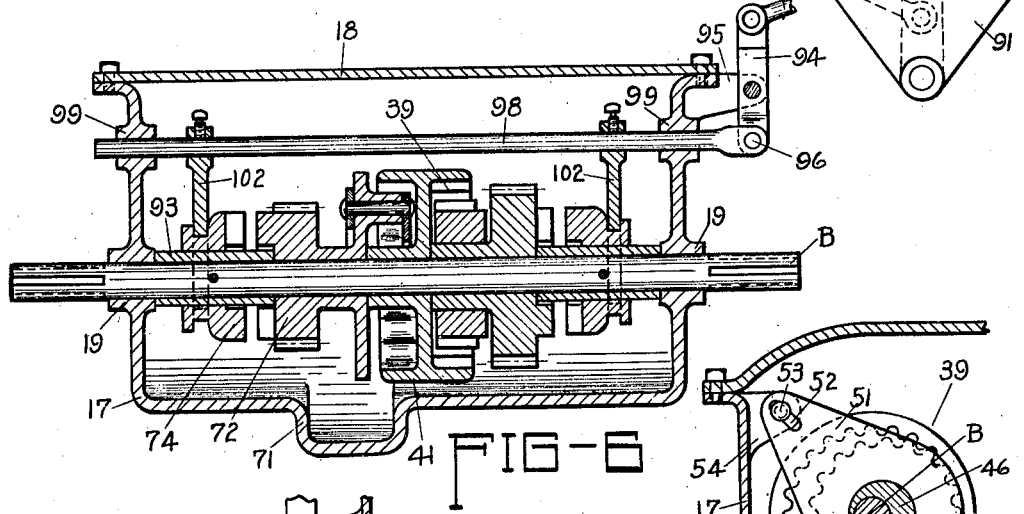
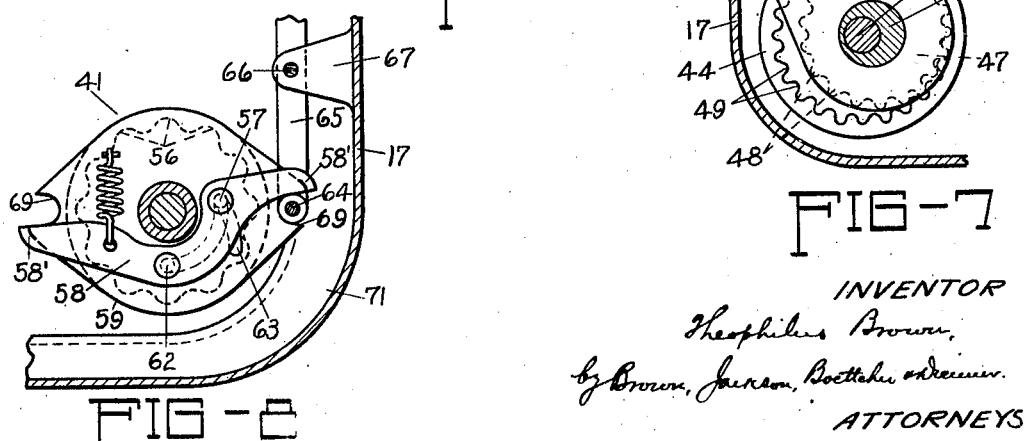
INVENTOR
Theophilus Brown,
by Brown, Jackson, Boettcher & Diener.
ATTORNEYS Patented Sept. 13, 1932

1,876,561

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

POWER TAKE-OFF MECHANISM FOR TRACTORS

Application filed January 9, 1928. Serial No. 245,335.

The present invention relates to power take-off mechanisms for tractors, the same having particular reference to farm tractors, although, as will hereinafter appear, the invention is not necessarily limited to this particular use.

With the widespread use of the tractor as a draft device for propelling farm implements, there has been a continuous development toward the practice of driving the different operating mechanisms of the implement directly from the power plant of the tractor. As illustrative of a few instances of such trend, it is quite customary in corn picking implements to drive the corn picking and husking mechanisms directly from the power plant of the tractor; in tractor propelled planters the seed selecting mechanisms are frequently driven directly from the engine power of the tractor; and in manure spreaders it has been proposed to drive the heater mechanism and also the feeding apron from the tractor. Moreover, in many types of implements, such as planters, cultivators and plows, there has been a tendency toward the development of power lifting mechanism which will derive its power from the tractor, such power lift mechanism serving to raise the soil engaging tools from the ground when the implement is to be turned at the ends of the field, or to be transported to or from the field. This development is due generally to the desire to drive the operating parts of the implements more efficiently and at the proper speed irrespective of the speed of travel of the implement; to avoid the necessity of relying on the traction power of the implement wheels for driving such operating parts, which generally requires considerable weight over the traction wheels and often precludes the use of the implement in soft ground when insufficient traction would be available; to relieve the operator of the duty of lifting the soil engaging tools at the ends of the field or of manually performing other intermittent or recurrent duties; and to permit of the construction of lighter and less expensive implements.

The power take-off devices heretofore provided on tractors have been inadequate to meet the numerous requirements for driving the different operating mechanisms of different types of implements, and it is the primary object of the present invention to meet the needs in this regard by providing an improved power take-off mechanism which will be universally adaptable to the transmission of power to all types of operating mechanisms on all classes of agricultural implements. As illustrative of this universal adaptability, the present mechanism is arranged to transmit power to two power take-off shafts which are arranged to be driven in opposite directions, and either or both of which may be employed; to provide for the transmission of different speeds to one of these shafts; and to provide for an intermittent operation of one of the shafts, the latter feature being desirable for the operation of power lift mechanism, or for the operation of the bundle carrier on a grain binder, or for the driving of other types of intermittently operating mechanism on different agricultural implements. The present power take-off mechanism is also arranged so that it is readily connectible to farm implements disposed either at the rear or at the front end of the tractor.

Other more specific objects of the invention will appear in the following detailed description of a preferred embodiment thereof. In the accompanying drawings illustrating such embodiment:

Fig. 5 is a similar view taken approximately on the plane of the line 5—5 of Fig. 3.

Figures 3, 4:
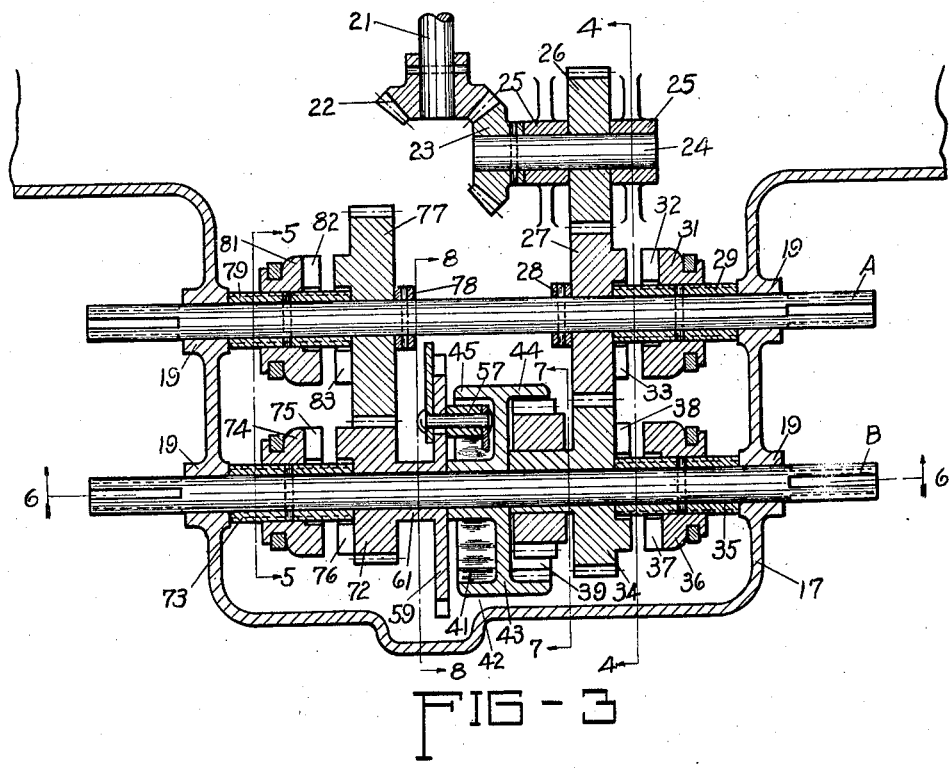
Fig. 3 is a sectional view through the power take-off mechanism, taken on an approximately horizontal plane.
Fig. 4 is a transverse sectional view taken approximately on the plane of the line 4—4 of Fig. 3.

Fig. 6 is a longitudinal sectional view through the secondary power take-off shaft, corresponding to a section on the plane of the line 6—6 of Fig. 3; and Figs. 7 and 8 are detailed sectional views taken approximately on the planes of the lines 7—7 and 8—8 respectively of Fig. 3.

Figure 1:
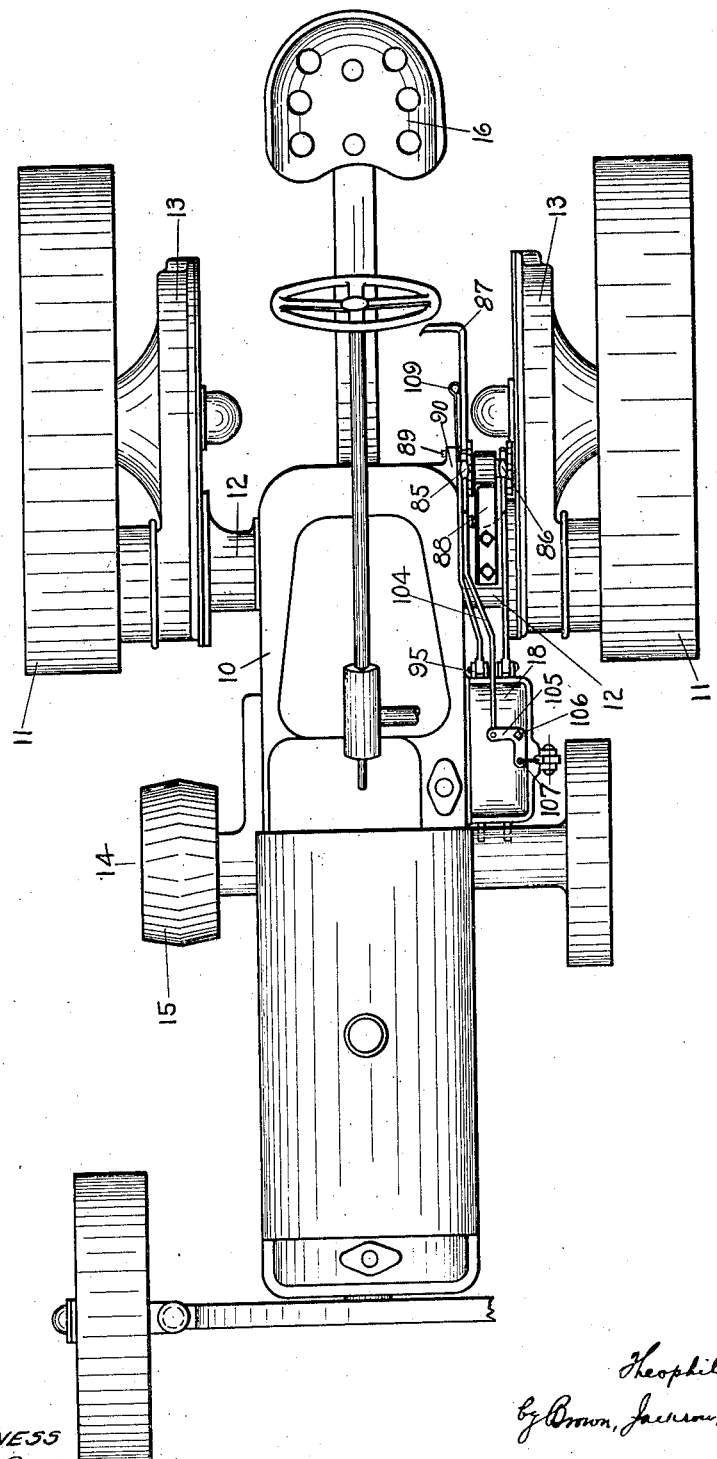
Fig. 1 is a fragmentary plan view of a typical tractor showing the preferred disposal of the power take-off mechanism thereon.
Figure 2:
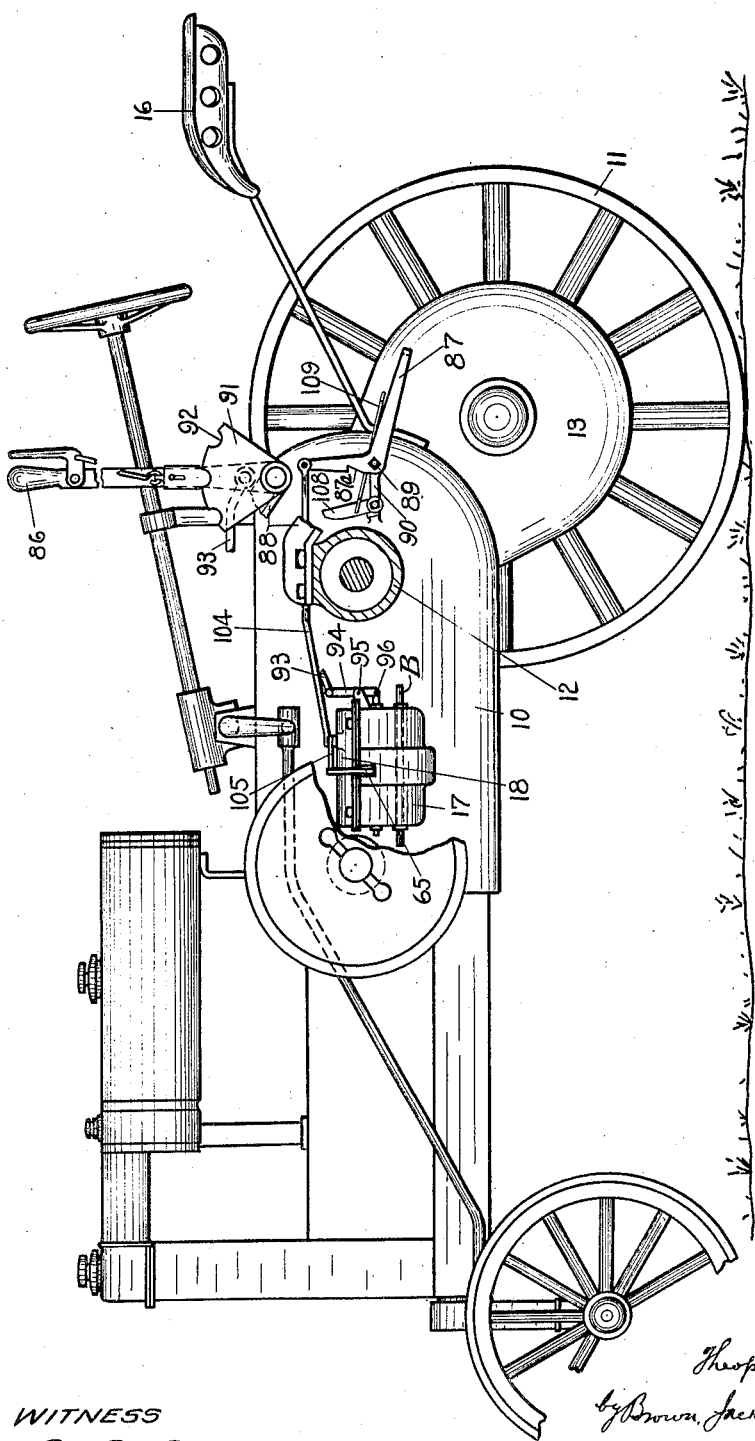
Fig. 2 is a side elevational view of the same, the rear wheel at the near side of the tractor being broken away to show the general location and arrangement of the power take-off mechanism, and certain of the control means being shifted slightly to expose other parts to view.

Figs. 1 and 2 in showing the present power take-off device embodied in a particular tractor design are merely illustrative of one adaptation, it being understood that this power take-off mechanism can be embodied in any other design of tractor or like vehicle. In the construction shown, the engine is located at the front end of the tractor, and the rear frame portion of the tractor consists of a housing 10 in which is enclosed the speed selecting transmission mechanism and the usual differential. The drive to the two rear wheels 11 is through laterally extending housings 12 and thence back to the axles of the wheels 11 through sprocket chains which are enclosed in rearwardly extending housings 13. The transmission of power from the engine back to the selective speed gear mechanism is governed by a clutch 14 which is actuatable by the operator in a manner well known to complete or interrupt the driving train back to the rear wheels 11. In the construction shown, this clutch 14 is embodied within the periphery of a belt pulley 15. The operator's seat 16 extends rearwardly from the housing 10, and the usual steering and tractor propelling controls are disposed in proximity to this seat.

Projecting laterally from one side of the frame housing 10, and preferably constructed integral therewith, is a housing extension 17 in which is enclosed the present power take-off mechanism. The side, bottom and end walls of this housing extension are closed, and the open top thereof is adapted to be closed by a removable cover 18, through which open top access is afforded to the power take-off mechanism. Extending longitudinally through said housing extension, and preferably in substantially the same horizontal plane, are two parallel shafts A and B which have bearing support in bosses 19 in the end walls of the housing extension (Fig. 3). These shafts constitute the two power take-off shafts of the mechanism, and it will be noted that they both extend forwardly and rearwardly from the opposite ends of the housing extension for effecting coupling connection with extension shafts leading either to an implement at the front end of the tractor or at the rear end thereof. The projecting ends of such shafts are splined or are provided with any other suitable coupling formations for establishing ready driving connection with the extension shafts leading to the implement parts, in a manner well known.

The drive from the engine of the tractor to the power take-off mechanism occurs through a shaft 21 which has any suitable operating connection (not shown) with the driving train of the tractor. Such shaft may be connected directly to the crank shaft of the engine so that it rotates at all times therewith, or it may be connected to one of the operating parts with is responsive to the actuation of the clutch 14, so that the drive to the take-off mechanism will be started and stopped with the engaging and releasing of said clutch. Mounted on the shaft 21 is a bevel gear 22 which meshes with a bevel gear 23 on a longitudinally extending shaft 24. The latter is journaled in two spaced bearings 25, between which is disposed a spur gear 26, which is non-rotatably secured to the shaft 24. Such spur gear transmits its drive to a spur gear 27 which is rotatably mounted on the first power take-off shaft A, the same being held against shifting on said shaft by a collar 28 bearing against one side of the gear and by a sleeve 29 bearing against the other side thereof. The sleeve 29 is pinned or keyed to the shaft A and has a splined outer surface on which a clutch collar 31 is mounted for shifting movement. Clutch teeth 32 projecting laterally from one face of the collar 31 are adapted to engage with cooperating clutch teeth 33 on the side of the gear 27, the clutch collar being shiftable into and out of clutching engagement through the actuation of control mechanism, which I shall hereinafter describe. It will be evident that clutching of the collar 31 to the gear 27 will cause the power take-off shaft A to rotate in the same direction and at the same speed as the gear 27.

From such gear, the drive is transmitted to another spur gear 34 which is rotatably mounted on the secondary power take-off shaft B. A sleeve 35 is secured to said shaft at one side of the gear 34, and mounted on the splined outer surface of this sleeve is another shiftable clutch collar 36 which has clutch teeth 37 for engaging with clutch teeth 38 on the adjacent side of the gear 34. It will be evident that by clutching the collar 36 to the gear 34, the shaft B will be driven at the same speed as the gear 34, and it will be noted that such rotation of the shaft B will be opposite to the rotation of the shaft A. Either shaft can be driven independently of the other, or both shafts can be driven together by corresponding operation of the two clutch collars 31 and 36. The two spur gears 27 and 34 are preferably of the same diameter so that when both clutches 31 and 36 are engaged the shafts A and B will be rotated at substantially the same speed.

From the gear 34 the drive is transmitted laterally to a speed reducing gear mechanism 39, and thence to a tripping or one-cycle clutch mechanism 41, both of which are mounted on the shaft B alongside the gear 34. Both mechanisms comprise as a common element a rotatable member 42, which constitutes the driven element of the speed reducing gear mechanism 39, and the driving element of the tripping clutch mechanism 41. As best shown in Fig. 3, such common member comprises a hub which is rotatably mounted on the shaft B, a radially extending web 43, and two laterally extending annular flanges 44 and 45 projecting from opposite sides of the web 43. Referring first to the speed reducing gear mechanism, and with particular reference to Fig. 7, the spur gear 34 has an eccentric hub 46 extending laterally therefrom and into the circular space defined by the annular flange 44. Rotatably mounted on this eccentric is a driving gear 47, the teeth 48 of which mesh with internal gear teeth 49 formed on the inner side of the flange 44. An arm 51 which is formed integral with, or is secured to one side of the driving gear 47, extends laterally beyond the gear mechanism to a suitable point of reaction, with which said arm has sliding, oscillatory connection. In the exemplary construction shown, the arm has a longitudinal slot 52 in its outer end which has sliding connection with a bolt or pin 53 carried by a lug 54 projecting inwardly from the outer side wall of the housing extension 17. In the operation of the speed reducing gear mechanism, the rotation of the spur gear 34 will revolve the eccentric 46, which will in turn swing the driving spur gear 47 through an orbital path around the axis of the shaft B, the ability of the arm 51 to shift endwise and to oscillate laterally permitting such motion. As the driving gear 47 moves through such eccentric path, its teeth 48 are progressively crowded between the teeth 49 of the driven element 44, exerting a camming pressure thereon. The eccentric movement of the spur gear 47 also results in a progressively shifting point of engagement between the two gears, which tends to carry the internal gear 49 at a slow speed with the eccentric motion of the driving spur gear 47. The result is that the internal gear 49, or rotatable member 42, is carried around with the eccentric movement of the driving gear 47 through a slow speed, continuous rotation, which is considerably slower than the rotation of the spur gear 34. The gear ratio is dependent upon the relative numbers of teeth 48 and 49, it being noted that the internal gear has a greater number of teeth than the driving gear 47. By virtue of this operation, it will be evident that a slow speed rotation will be continuously transmitted from the gear 34 to the flange 45 of the rotatable member 42, which flange constitutes the driving element of the tripping clutch mechanism 41.

Referring now to the construction of such clutch mechanism, and with particular reference to Fig. 8, it will be seen that the inner circumference of said flange is provided with a series of notches 56. Adapted for engagement in these notches is a clutch roller 57, which is mounted on one side of a trigger lever 58 carried by the driven clutch member 59. Such driven clutch member is in the form of a disc (Fig. 3) having a laterally extending hub 61 which is rotatably mounted on the shaft B. The trigger lever 58 is pivoted to the driven clutch member at 62, and a tension spring is suitably connected to said lever so as normally to swing the clutching roller 57 into the notches 56. The stud on which the roller 57 is mounted extends through a slot 63 in the clutch plate 59, which slot is curved to permit swinging movement of the lever 58, incident to the clutch and unclutching movement of the roller 57. The trigger lever 58 is provided with outwardly extending trigger ends 58' which project beyond the periphery of the clutch mechanism and are adapted to be engaged by a roller 64 carried by a trip lever 65. The latter is pivotally supported at 66 on a bracket 67 extending inwardly from the outer wall of the housing extension 17, the upper end of the lever 65 passing out through a slot in the upper portion of the housing extension. The projecting upper end of such lever is suitably connected with tripping mechanism arranged to be actuated by the operator, as I shall presently describe. Any suitable spring is connected to the lever 65, or to one of the actuated parts associated therewith, so as normally to swing the lever inwardly to hold the roller 64 against the periphery of the driven clutch member 59, in which position the roller 64 is adapted to intercept one or the other of the trigger ends 58' for rocking the trigger lever and thereby disconnecting the two clutch elements. The periphery of the driven clutch element 59 is provided with diametrically opposite notches 69 in proximity to the trigger ends 58', the arrangement being such that after the roller 64 has actuated one of the trigger ends 58' to release the clutch, said roller will drop into the associated notch 69 and thereby lock the driven clutch member 59 against rotation in either direction. The housing extension 17 is illustrated as being provided with a channel 71 in its bottom and outer walls to accommodate the larger diameter of the driven clutch element 59 and the extending trigger ends 58'.

It will be understood from the foregoing description that whenever the lever 65 is actuated to swing the roller 64 clear of one of the trigger ends 58', the trigger lever 58 will oscillate on its pivot 62 to swing the clutch roller 57 into the notches 56. Thereupon the clutch will be engaged and the driven clutch member 59 will take up the slow speed rotation of the driving clutch member 45. Assuming that the lever 65 has been allowed to swing back to normal position, immediately after being tripped, the driven clutch element will be rotated through a half revolution, whereupon the opposite trigger end 58' will engage the roller 64, the latter also snapping into the adjacent notch 69, with the result that the clutch will be disengaged and the driven clutch element will be brought to a stop and locked in such position. Assuming, on the other hand, that the lever 65 has been held in its tripped position, with the roller 64 clear of the trigger ends 58', it will be evident that the clutch will remain engaged for transmitting continuous rotation to the driven clutch element 59 as long as the lever 65 is retained in this tripped position. From what has been said, it will be seen that the clutch mechanism 41 is capable of transmitting driving rotation through a predetermined cycle, and then automatically stopping or interrupting the further transmission of driving energy. Because of this characteristic operation, I have chosen to refer to this clutch as a "one-cycle stop" mechanism. Such clutches are commonly employed on power lift plows and other agricultural implements, where they are frequently referred to as "half revolution" clutches. It will be evident, however, that the complete cycle of operation need not be limited to a half revolution, as the clutch might be constructed to release only after the completion of a full revolution.

Referring again to Fig. 3, it will be seen that the hub or sleeve 61, which extends laterally from the driven clutch member 59, has a relatively small spur gear 72 provided at its end. This gear is rotated at the slow speed resulting from the speed reducing mechanism 39, and with the intermittent or continuous rotation consequent upon the operation of the clutch mechanism 41. A sleeve 73 is secured to the shaft B on the other side of the gear 72, and a clutch collar 74 is splined for shifting movement along such sleeve. The jaw teeth 75 of such clutch collar are adapted to engage with cooperating teeth 76 on the adjacent side of the gear 72. It will be evident that by clutching the collar 74 to the gear 72, the secondary take-off shaft B will be made to partake of the slow speed, intermittent or continuous, rotation of the gear 72.

Such gear also transmits a drive to another spur gear 77 which is rotatably mounted on the primary take-off shaft A, the gear 77 preferably being of larger diameter than the gear 72, so that it will have a slower rotation. This large gear is confined between a collar 78 and a sleeve 79, both pinned to the shaft A, the sleeve having a splined outer surface on which is shiftably mounted a clutch collar 81. The jaw teeth 82 are adapted to engage with jaw teeth 83 on the side of the gear 77, and when such engagement is effected, it will be seen that the take-off shaft A will be driven concurrently with the spur pinion 72, at a lower speed, however.

The control of the power take-off mechanism is accomplished through manipulation of two hand levers 85 and 86 and a tripping clutch pedal 87. The two hand levers are fulcrumed on a bracket 88 supported adjacent to the rear end of the frame housing 10 so as to dispose said levers in convenient proximity to the operator's seat 16, and the tripping pedal 87 is fulcrumed at 89 on a suitable bracket 90 formed on the rear portion of the housing 10 in convenient position for operation. Fig. 2 illustrates the rear portion of the bracket 88 as being broken away and raised slightly, to avoid obscuring the illustration of the tripping pedal 87. Each lever 85, 86 is provided with any conventional type of latch mechanism for engaging with an individual latching quadrant 91, each of said latching quadrants having three notches 92 therein for receiving the detent member of the lever. The intermediate notch 92 corresponds to a neutral position of the clutch parts controlled by such lever, and the two end notches correspond to different operating conditions, as will be presently described. The two levers are substantial duplicates, and pivotally connected to both levers are similar operating rods or links 93. Such rods extend forwardly and are pivotally connected to the upper ends of two companion levers 94, each of which is pivotally mounted between pairs of lugs 95 projecting rearwardly from the housing extension 17. The lower end of each lever 94 is pivotally connected at 96 to an individual shifter rod which is mounted in the housing extension 17. Referring to Figs. 5 and 6, the two shifter rods 97 and 98, each of which is individually operated by the hand levers 85 and 86 through the above described operating connections, have slidable bearing support in bosses 99 in the end walls of the housing extension 17. Such shifter rods are disposed directly above the shafts A and B. Secured to the rod 97 are two shifting forks 101 which extend downwardly and engage in annular grooves in the two clutch collars 31 and 81. Secured to the other shifter rod 98 are two similar shifting forks 102 which extend down and engage in annular grooves in the two clutch collars 36 and 74. The arrangement is such that when the control lever 85 is in its neutral position the two clutches 31 and 81 will likewise be disposed in neutral position, out of engagement with their respective gears 27 and 77, and that when such control lever is moved in one direction or the other, one of the clutch collars 31 or 81 will be shifted into clutching engagement with its corresponding gear. The same arrangement holds true for the other control lever 86 and the clutch collars 36 and 74, the latter being held in neutral position when such lever is in its neutral position, and being shifted selectively into or out of clutching engagement with their respective gears 34 and 72 by appropriate movement of the control lever 86.

The tripping pedal 87 has an upwardly extending arm to which is pivotally connected a forwardly extending rod 104. Referring to Fig. 1, the front end of such rod is linked to a bell crank lever 105 which is pivotally supported at 106 on the cover 18 of the extension housing. The other arm of said bell crank lever is pivotally connected at 107 to the upper end of the tripping lever 65. Referring again to Fig. 2, a suitable locking dog 108 which is pivotally supported on the frame bracket 90 is adapted to be shifted by the operator, through the medium of shifter rod 109, into position to engage a notch 87a formed in the upwardly extending arm of the pedal 87, when the latter is depressed to a tripping position for holding the pedal down or can be readily released therefrom to permit the pedal to swing upwardly. The operating connections just described result in the tripping lever 65 being swung outwardly into clutch engaging position when the tripping pedal 87 is depressed, the lever 65 being held in its clutch engaging position as long as the pedal 87 is held down, either under the foot of the operator or by virtue of being latched by the dog 108. The intermittent or one-cycle stop operation of the clutch mechanism is obtained by merely stroking the pedal 87 downwardly and allowing it to return immediately thereafter; and continuous engagement of the clutch is obtained by holding the pedal 87 depressed.

In explaining the operation of the mechanism I shall set forth separately each of the several driving combinations, and for brevity of description I shall refer to the two power take-off shafts merely as "A" and "B". The control operations shall be considered as occurring from a neutral condition of the operating parts.

A idle, B running fast—such operating condition is obtained by shifting the jaw clutch 36 into engagement with its gear 34.

A running fast, B idle—such condition, which is the converse of the one above described, is obtained by shifting the jaw clutch 31 into engagement with the gear 27, instead of shifting the clutch 36.

A running fast, B running fast—such condition is obtained by shifting both clutches 31 and 36 into engagement with their respective gears 27 and 34.

A idle, B running slow—such condition is obtained by shifting the jaw clutch 74 into engagement with its gear 72, and at the same time holding the tripping pedal 87 depressed. The slow speed, continuous rotation of the gear 72 is then transmitted to the shaft B.

A running slow, B idle—such operating condition, which is the converse of the one above stated, is obtained by shifting the clutch 81 into engagement with its gear 77 instead of actuating the clutch 74. The tripping pedal 87 is held depressed. The slow speed, continuous rotation of the gear 72 will drive the shaft A through the gear 77 and clutch 81. It will be noted that an additional speed reduction is obtained between the gears 72 and 77.

A running slow, B running slow—such condition is obtained by moving both clutches 74 and 81 into engagement with their respective gears 72 and 77 and retaining the tripping pedal 87 depressed.

A running fast, B running slow—such driving condition is obtained by engaging the clutches 31 and 74 with their respective gears 27 and 72, meanwhile holding the tripping pedal 87 depressed.

A running slow, B running fast—such operating condition, which is the converse of the one above described, is obtained by shifting the clutches 36 and 81 into engagement with their respective gears 34 and 77, meanwhile retaining the tripping pedal 87 depressed.

A idle, B intermittent—such condition is obtained by engaging the clutch 74 with its gear 72, and then tripping the pedal 87 for securing the intermittent operation of shaft B.

A intermittent, B idle—such condition is obtained by engaging the clutch 81 with its gear 77, and then tripping the pedal 87, as desired.

A intermittent, B intermittent—this operating condition is obtained by engaging both clutches 74 and 81 with their respective gears 72 and 77, and tripping the pedal 87 as desired.

A running fast, B intermittent—such drive is obtained by engaging the clutches 31 and 74 with their respective gears 27 and 72, and tripping the pedal 87 as desired.

A intermittent, B running fast—this drive, the converse of the one above described, is obtained by engaging the clutches 36 and 81 with their respective gears 34 and 77, and then tripping the pedal 87 as desired.

In summarizing these various operating conditions it will be seen that the two shafts A and B always rotate in opposite directions. To either of these shafts may be selectively transmitted either a relatively high speed drive, a relatively low speed drive, or an automatically interrupted drive, obtained by actuation of the tripping clutch mechanism 41. Hence, irrespective of which direction of rotation is required for driving the operating mechanism of the implement, both are available at the present power take-off mechanism, and such drive can be of relatively high speed, low speed or can be automatically interrupted. Moreover, two drives can be extended to the implement, and each of such drives can have different operating characteristics, corresponding to the requirements of the mechanisms which they are to drive. As previously remarked, the intermittent or one-cycle stop drive can be employed advantageously for raising the soil engaging tools from the ground at the ends of the field, or for actuating an intermittently operating bundle carrier on a grain binder, or for performing any other intermittent duty. By disposing the two power take-off shafts A and B to one side of the tractor frame or housing, and by making both ends of each shaft available for the establishment of operating connections, the transmission of these drives can be made with equal facility to an implement disposed either at the front or rear end of the tractor.

While the principal utility of the invention resides in the transmission of power to the operating parts of an implement which is being propelled by the tractor, nevertheless it will be understood that the invention is not necessarily limited thereto, as the present mechanism may be employed for transmitting power to different types of machines while the tractor is stationary, which additional utilities of the tractor are commonly classified as "belt work." It will also be understood that in its broader aspect the invention has adaptability to other fields of power transmission where a multiplicity of drives, of different characteristics, are desired.

I claim:

1. The combination with a tractor comprising a driving member, of power take-off mechanism on said tractor adapted to be driven by said driving member, said power take-off mechanism comprising two take-off shafts adapted for selective coupling to the mechanism to be driven, one of said shafts extending longitudinally of the tractor for transmitting take-off power to implement parts at one end of the tractor, and gear mechanism operable selectively to transmit a relatively high speed to either of said shafts or a relatively low speed to either of said shafts.

2. The combination with a tractor comprising a driving member, of power take-off mechanism on said tractor adapted to be driven by said driving member, said power take-off mechanism comprising two take-off shafts adapted for selective coupling to the mechanism to be driven, one of said shafts extending longitudinally of the tractor for transmitting take-off power to implement parts at one end of the tractor and mechanism including intermeshing toothed gears operable selectively to transmit a relatively high speed to either of said shafts, and concurrently therewith a relatively low speed to the other of said shafts.

3. The combination with a tractor comprising a driving member, of power take-off mechanism on said tractor adapted to be driven by said driving member, said power take-off mechanism comprising two take-off shafts, one of said shafts extending longitudinally of the tractor for transmitting take-off power to implement devices at either end of the tractor, and mechanism operable selectively to transmit an automatically interrupted drive to one of said shafts.

4. The combination with a tractor comprising a driving member, of power take-off mechanism on said tractor adapted to be driven by said driving member, said power take-off mechanism comprising two take-off shafts, and mechanism operable selectively to transmit a one-cycle stop rotation to either of said shafts, said mechanism including coacting gears on said shafts.

5. The combination with a tractor comprising a driving member, of a power take-off mechanism on said tractor adapted to be driven by said driving member, said power take-off mechanism comprising two take-off shafts, and mechanism for driving said shafts including coacting gears associated with said shafts, said mechanism being operable to transmit a continuous drive to one of said shafts and an automatically interrupted drive to the other of said shafts.

6. The combination with a tractor comprising a driving member, of power take-off mechanism on said tractor, adapted to be driven by said driving member, said power take-off mechanism comprising two take-off shafts, and mechanism operable selectively to transmit either a relatively high or low speed drive to either of said shafts, or to transmit an automatically interrupted drive to one of said shafts.

7. The combination with a tractor comprising a driving member, of power take-off mechanism on said tractor adapted to be driven by said driving member, said power take-off mechanism comprising two take-off shafts arranged to rotate in opposite directions, means including coacting gears on said shafts and operable selectively to transmit either a relatively high speed or low speed drive to one of said shafts, and a one-cycle stop mechanism adapted to transmit an automatically interrupted drive to one of said shafts.

8. The combination with a tractor comprising a driving member, of power take-off mechanism on said tractor adapted to be driven by said driving member, said power take-off mechanism comprising two take-off shafts arranged to rotate in opposite directions, means operable selectively to transmit either a relatively high speed or low speed drive to either of said shafts, a one-cycle stop clutch adapted to control the drive to one of said shafts, and means for controlling the operation of said clutch.

9. The combination with a tractor comprising a driving member, of power take-off mechanism on said tractor adapted to be driven by said driving member, said power take-off mechanism comprising two take-off shafts adapted for selective coupling to driven mechanism located either at the front or rear end of the tractor, two pairs of meshing gears on said shafts, and clutch mechanism adapted selectively to couple said shafts to said gears.

10. The combination with a tractor comprising a driving member, of power take-off mechanism on said tractor adapted to be driven by said driving member, said power take-off mechanism comprising two take-off shafts adapted for selective coupling to the mechanism to be driven, a pair of gears on one of said shafts, a pair of gears on the other of said shafts, both pairs of gears meshing, speed reduction gearing connecting the two gears on one of said shafts, and clutch mechanism operable selectively to engage said shafts with said gears.

11. The combination with a tractor comprising a driving member, of power take-off mechanism on said tractor adapted to be driven by said driving member, said power take-off mechanism comprising two take-off shafts, a pair of gears rotatably mounted on one of said shafts, a pair of gears rotatively mounted on the other of said shafts, both pairs of gears meshing, a one-cycle stop mechanism operatively connecting the two gears on one of said shafts, means for selectively clutching said gears to said shaft, and means for controlling the operation of said one-cycle stop mechanism.

12. The combination with a tractor comprising a driving member, of power take-off mechanism on said tractor adapted to be driven by said driving member, said power take-off mechanism comprising a primary take-off shaft and a secondary take-off shaft, a pair of gears on each of said shafts, both pairs of gears meshing, means for driving one of the gears on said primary shaft from said driving member, mechanism for transmitting rotation between the two gears on said secondary shaft comprising speed reducing gearing and a one-cycle stop clutch, said clutch being operable to interrupt the transmission of rotation between the two gears on said secondary shaft, jaw clutches on each of said shafts for selectively coupling each of said gears to said shafts, means for actuating said jaw clutches, and means for tripping said one-cycle stop clutch.

13. The combination with a tractor including propelling means for transmitting power to the traction wheels and comprising a housing portion, of power take-off mechanism on said tractor separate from said propelling means and comprising two take-off shafts mounted in said housing portion, and mechanism in said housing portion for selectively transmitting different drives to said shafts, said shafts extending substantially longitudinally of the tractor and having both ends projecting beyond said housing portion for establishing coupling connections with power transmitting parts extending either to an implement at the front end of the tractor or to an implement at the rear end thereof.

14. The combination with a tractor having a motor and ground engaging traction means receiving power therefrom for propelling the tractor, of power take-off mechanism also receiving power from said motor for operating implement parts associated with the tractor, said power take-off mechanism comprising a housing at the side of the tractor, a first shaft rotatably mounted in said housing on an axis extending substantially longitudinally of the tractor with the ends of said shaft projecting from said housing for establishing operative connections with devices transmitting power to implement parts at either end of the tractor, a second shaft rotatably mounted in said housing for transmitting power to implement parts, and means in said housing for operatively connecting said shafts comprising gears and an automatically interrupting clutch.

15. The combination with a tractor having a motor and ground engaging traction means receiving power therefrom for propelling the tractor, of power take-off mechanism also receiving power from said motor for operating implement parts associated with the tractor, said power take-off mechanism comprising a housing at the side of the tractor, a first shaft rotatably mounted in said housing on an axis extending substantially longitudinally of the tractor, with the ends of said shaft projecting from said housing for establishing operative connections with devices transmitting power to implement parts at either end of the tractor, a second shaft rotatably mounted in said housing for transmitting power to implement parts, a gear mounted coaxially of said first shaft meshing with a gear mounted coaxially of said second shaft, and an automatically interrupted clutch driven by said latter gear for transmitting an intermittent drive to said second shaft.

16. The combination with a tractor having a motor, ground engaging traction means receiving power therefrom through speed selecting transmission mechanism for propelling the tractor and a housing enclosing said transmission mechanism, of power take-off mechanism also receiving power from said motor for operating implement parts associated with the tractor, said power take-off mechanism comprising a transverse shaft extending laterally in said housing and adapted to have operative connection with the motor, a first shaft extending substantially longitudinally of the tractor and disposed at the side of said housing, the opposite ends of said shaft being operative to transmit power to implement parts at either end of the tractor, means for driving said first shaft from said transverse shaft, a second shaft rotatably mounted adjacent to the side of said housing, gear means for transmitting rotation from said transverse shaft to said second shaft, and an automatically interrupting clutch capable of transmitting intermittent rotation to said second shaft for operating intermittently actuated implement parts connected with said second shaft.

17. The combination with a tractor having a motor and ground engaging traction means receiving power therefrom for propelling the tractor, of power take-off mechanism also receiving power from said motor for operating implement parts associated with the tractor, said power take-off mechanism comprising a first shaft for establishing operative connection with implement parts at one end of the tractor, a second shaft for transmitting power to implement parts independently of or conjointly with said first shaft, cooperating gears mounted concentrically of said shafts for transmitting power to said second shaft, and an automatically interrupting clutch for effecting intermittent operation of one of said shafts.

18. The combination with a tractor having a motor and ground engaging traction wheels receiving power therefrom through a speed selecting transmission mechanism for propelling the tractor, said transmission mechanism being enclosed in a housing, of power take-off mechanism also receiving power from said motor for operating implement parts associated with the tractor, said power take-off mechanism comprising an extension housing on the side of said main housing, a transverse shaft in said main housing adapted to be driven from said motor, a first power take-off shaft mounted in said housing extension and having its opposite ends projecting longitudinally therefrom for establishing coupled connection with extension shafts leading to implement parts at either end of the tractor, a pair of bevel gears for transmitting power from said transverse shaft to said first take-off shaft, a second take-off shaft rotatably mounted in said housing extension for transmitting power to implement parts either independently of or conjointly with said first take-off shaft, cooperating gears mounted coaxially of said two take-off shafts for transmitting power to said second take-off shaft, and an automatically interrupting clutch mounted coaxially of said second take-off shaft for effecting an intermittent operation of said latter shaft.

19. The combination with a tractor having a motor and ground engaging traction means receiving power therefrom for propelling the tractor, of power take-off mechanism also receiving power from said motor for operating implement parts associated with the tractor, said power take-off mechanism comprising two power take-off devices adapted to transmit motion to the implement parts either individually or conjointly, means operative to transmit continuous motion to one of said devices, said latter device extending substantially longitudinally of the tractor for transmitting take-off power to implement parts at one end of the tractor, and means including cooperating gears and an automatic one-cycle stop clutch for transmitting intermittent motion to the other of said devices.

20. The combination with a tractor having a motor and ground engaging traction means receiving power therefrom for propelling the tractor, of power take-off mechanism also receiving power from said motor for operating implement parts associated with the tractor, said power take-off mechanism comprising a housing on the side of the tractor, a shaft rotatably supported in said housing and having one end extending therefrom for effecting coupled connection with implement parts at either end of the tractor for transmitting take-off power thereto, and means for driving said shaft including an automatic one-cycle stop clutch enclosed within said housing and operative to transmit intermittent rotation to said shaft.

21. The combination with a tractor having a motor and ground engaging traction means receiving power therefrom for propelling the tractor, of power take-off mechanism also receiving power from said motor for operating implement parts associated with the tractor, said power take-off mechanism comprising a housing, a first shaft rotatably mounted in said housing on an axis extending substantially longitudinally of the tractor, with one end of said shaft projecting from said housing for establishing an operative connection with a device transmitting power to implement parts at one end of the tractor, a second shaft rotatably mounted in said housing for transmitting power to implement parts, and means in said housing for operatively connecting said shafts comprising gears and an automatically interrupting clutch.

22. The combination with a tractor having a motor and ground engaging traction means receiving power therefrom for propelling the tractor, of power take-off mechanism also receiving power from said motor for operating implement parts associated with the tractor, said power take-off mechanism comprising a housing on the tractor, a first shaft rotatably mounted in said housing on an axis extending substantially longitudinally of the tractor, with one end of said shaft projecting from said housing for establishing operative connection with a device transmitting power to implement parts at one end of the tractor, a second shaft rotatably mounted in said housing for transmitting power to implement parts, a gear mounted coaxially of said first shaft meshing with a gear mounted coaxially of said second shaft, and an automatically interrupted clutch driven by said latter gear for transmitting an intermittent drive to said second shaft.

23. The combination with a tractor having a motor, ground engaging traction means receiving power therefrom through a speed selecting transmission mechanism for propelling the tractor and a housing enclosing said transmission mechanism, of power take-off mechanism also receiving power from said motor for operating implement parts associated with the tractor, said power take-off mechanism comprising a transverse shaft mounted in said housing and adapted to have operative connection with the motor, a first shaft extending substantially longitudinally of the tractor and projecting from said housing, one end of said shaft being operative to transmit power to implement parts at one end of the tractor, means for driving said first shaft from said transverse shaft, a second shaft for transmitting power to implement parts, gear means for transmitting rotation from said transverse shaft to said second shaft, and an automatically interrupting clutch capable of transmitting intermittent motion to said second shaft for operating intermittently actuated implement parts connected with said second shaft.

24. The combination with a tractor having a motor and ground engaging traction means receiving power therefrom for propelling the tractor, of power take-off mechanism also receiving power from said motor for operating implement parts associated with the tractor, said power take-off mechanism comprising a first shaft rotatably mounted on an axis extending substantially longitudinally of the tractor, with the ends of said shaft adapted to establish operative connection with devices transmitting power to implement parts at either end of the tractor, a second shaft rotatably mounted for establishing operative connection with an implement, a gear mounted coaxially of said first shaft meshing with a gear mounted coaxially of said second shaft, and an automatically interrupted clutch driven by said latter gear for transmitting an intermittent drive to said second shaft.

25. The combination with a tractor having a motor and ground engaging traction means receiving power therefrom for propelling the tractor, of power take-off mechanism also receiving power from said motor for operating implement parts associated with the tractor, said power take-off mechanism comprising a housing on the side of the tractor, a shaft rotatably supported in said housing and having its ends extending therefrom for effecting coupled connections with implement parts at either end of the tractor for transmitting take-off power thereto, means for driving said shaft including an automatic one cycle stop clutch enclosed within said housing and operative to transmit intermittent rotation to said shaft.

26. The combination with a tractor having a motor, ground engaging traction means receiving power therefrom for propelling the tractor, and a housing enclosing driving parts of the tractor, of power take-off mechanism also receiving power from said motor for operating implement parts associated with the tractor, said power take-off mechanism comprising a secondary housing associated with said first named housing, a shaft rotatably supported in said secondary housing and having its ends extending therefrom for effecting coupled connections with implement parts at either end of the tractor for transmitting take-off power thereto, and means for driving said shaft including an automatic one-cycle stop clutch enclosed within one of said housings and operative to transmit intermittent rotation to said shaft.

27. The combination with a tractor having a motor and ground engaging traction means receiving power therefrom for propelling the tractor, of power take-off mechanism also receiving power from said motor for operating implement parts associated with the tractor, said power take-off mechanism comprising a transverse shaft extending laterally of the tractor and adapted to have operative connection with the motor, a shaft rotatably supported and driven through said transverse shaft for effecting coupled connection with implement parts at either end of the tractor for transmitting take-off power thereto, and means for driving said shaft including an automatic one-cycle stop clutch operative to transmit intermittent rotation to said shaft.

In witness whereof, I hereunto subscribe my name this 15th day of December, 1927.

THEOPHILUS BROWN.